: US 10,429,815 B2
Oct. 1, 2019

(12) United States Patent
Yoshiura et al.

(54) MOTOR CONTROL DEVICE, POSITION CONTROL SYSTEM, AND MOTOR CONTROL METHOD

(71) Applicant: Kabushiki Kaisha Yaskawa Denki, Kitakyushu-shi (JP)

(72) Inventors: Yasufumi Yoshiura, Kitakyushu (JP); Yusuke Oka, Kitakyushu (JP); Toshinobu Kira, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/238,910

(22) Filed: Aug. 17, 2016

(65) Prior Publication Data

US 2017/0052526 A1    Feb. 23, 2017

(30) Foreign Application Priority Data

Aug. 19, 2015 (JP) .................................. 2015-162104

(51) Int. Cl.
*G05B 19/402* (2006.01)
*H02K 11/21* (2016.01)

(52) U.S. Cl.
CPC ........... *G05B 19/402* (2013.01); *H02K 11/21* (2016.01); *G05B 2219/36454* (2013.01); *G05B 2219/41407* (2013.01); *G05B 2219/41418* (2013.01)

(58) Field of Classification Search
CPC ........... G05B 2219/45215; G05B 2219/49362; G05B 2219/49398; H02P 21/0003; H02P 5/00; H02P 5/50; H02P 5/56; H02P 5/74; H02P 6/006; H02P 6/10; H02P 5/51
See application file for complete search history.

(56) References Cited

U.S. PATENT DOCUMENTS

| | | | | |
|---|---|---|---|---|
| 4,888,538 A | * | 12/1989 | Dimitrov | B25J 3/04 307/87 |
| 4,897,586 A | * | 1/1990 | Nakata | G05B 19/42 318/568.16 |
| 5,136,222 A | * | 8/1992 | Yamamoto | G05B 19/4148 318/111 |
| 5,252,900 A | * | 10/1993 | Uehara | G05B 19/41 318/49 |
| 5,696,590 A | * | 12/1997 | Makita | G03F 7/70358 356/399 |
| 6,097,168 A | * | 8/2000 | Katoh | 318/560 |

(Continued)

FOREIGN PATENT DOCUMENTS

JP    3860014 B2    12/2006

*Primary Examiner* — Bickey Dhakal
(74) *Attorney, Agent, or Firm* — Oblon, McClelland, Maier & Neustadt, L.L.P.

(57) ABSTRACT

A motor control device for controlling driving of a motor based on position commands input from a host control device includes an offset value memory including first circuitry which stores offset values corresponding to predetermined values of position commands, respectively, and a drive controller including second circuitry which acquires, from the offset value memory, one of the offset values corresponding to an input position command among the position commands, and control driving of a motor based on an offset position command obtained by adding the one of the offset values to or subtracting the one of the offset values from the input position command.

16 Claims, 9 Drawing Sheets

(56) References Cited

U.S. PATENT DOCUMENTS

| | | | | |
|---|---|---|---|---|
| 6,326,747 B1* | 12/2001 | Shiba | H02P 5/56 | 318/41 |
| 6,630,986 B2* | 10/2003 | Inoue | G03B 27/42 | 318/625 |
| 6,771,036 B2* | 8/2004 | Fujita | G05B 19/19 | 318/575 |
| 7,158,900 B2* | 1/2007 | McNutt | G05B 11/28 | 702/73 |
| 7,187,148 B2* | 3/2007 | Okita | G05B 19/404 | 318/432 |
| 7,215,089 B2* | 5/2007 | Toyozawa | G05B 19/186 | 318/434 |
| RE40,165 E * | 3/2008 | Shiba | H02P 5/56 | 318/41 |
| 7,348,745 B2* | 3/2008 | Okita | G05B 19/358 | 318/432 |
| 7,453,227 B2* | 11/2008 | Prisco | A61B 19/22 | 318/568.11 |
| 7,656,106 B2* | 2/2010 | Iwashita | G05B 19/195 | 318/39 |
| 7,668,674 B2* | 2/2010 | McNutt | G05B 11/28 | 318/599 |
| 7,906,925 B2* | 3/2011 | Takeuchi | H02P 5/00 | 310/68 B |
| 8,305,016 B2* | 11/2012 | Okita | G05B 19/404 | 318/34 |
| 8,587,247 B2* | 11/2013 | Yoshiura | G05B 19/4141 | 318/432 |
| 8,680,805 B2* | 3/2014 | Sonoda | H02P 5/50 | 318/400.14 |
| 8,692,488 B2* | 4/2014 | Takayama | G05B 19/416 | 318/49 |
| 8,947,036 B2* | 2/2015 | Amigasaya | G05B 19/237 | 318/400.33 |
| 2001/0008370 A1* | 7/2001 | Fujita | G05B 19/19 | 318/560 |
| 2003/0128345 A1* | 7/2003 | Inoue | G03B 27/42 | 355/53 |
| 2004/0128018 A1* | 7/2004 | Sugie | G05B 19/182 | 700/160 |
| 2005/0024003 A1* | 2/2005 | Kochiya | G05B 19/19 | 318/569 |
| 2005/0168178 A1* | 8/2005 | Toyozawa | G05B 19/186 | 318/68 |
| 2005/0273287 A1* | 12/2005 | McNutt | G05B 11/28 | 702/73 |
| 2006/0113946 A1* | 6/2006 | Okita | G05B 19/404 | 318/651 |
| 2006/0158143 A1* | 7/2006 | Okita | G05B 19/358 | 318/276 |
| 2006/0186845 A1* | 8/2006 | Terada | G05B 19/19 | 318/432 |
| 2006/0258143 A1* | 11/2006 | Kuo | H01L 21/76849 | 438/618 |
| 2007/0007926 A1* | 1/2007 | Iwashita | G05B 19/4141 | 318/625 |
| 2007/0138992 A1* | 6/2007 | Prisco | A61B 19/22 | 318/568.21 |
| 2008/0218116 A1* | 9/2008 | Maeda | G05B 19/19 | 318/571 |
| 2009/0079372 A1* | 3/2009 | Takeuchi | H02P 6/006 | 318/400.04 |
| 2009/0102409 A1* | 4/2009 | Okita | G05B 19/404 | 318/561 |
| 2011/0169441 A1* | 7/2011 | Yoshiura | G05B 19/4141 | 318/625 |
| 2012/0271439 A1* | 10/2012 | Yamamoto | B23Q 11/0028 | 700/73 |
| 2012/0299524 A1* | 11/2012 | Amigasaya | G05B 19/237 | 318/625 |
| 2013/0026964 A1* | 1/2013 | Sonoda | H02P 5/50 | 318/625 |
| 2013/0134919 A1* | 5/2013 | Takayama | G05B 19/416 | 318/625 |

\* cited by examiner

FIG. 5

Correction Value Table

| Y-axis Position Command | Interaxial Correction Value |
|---|---|
| 0 | 2 |
| 10 | 12 |
| 20 | −3 |
| 30 | 6 |
| 40 | −4 |
| ... | ... |

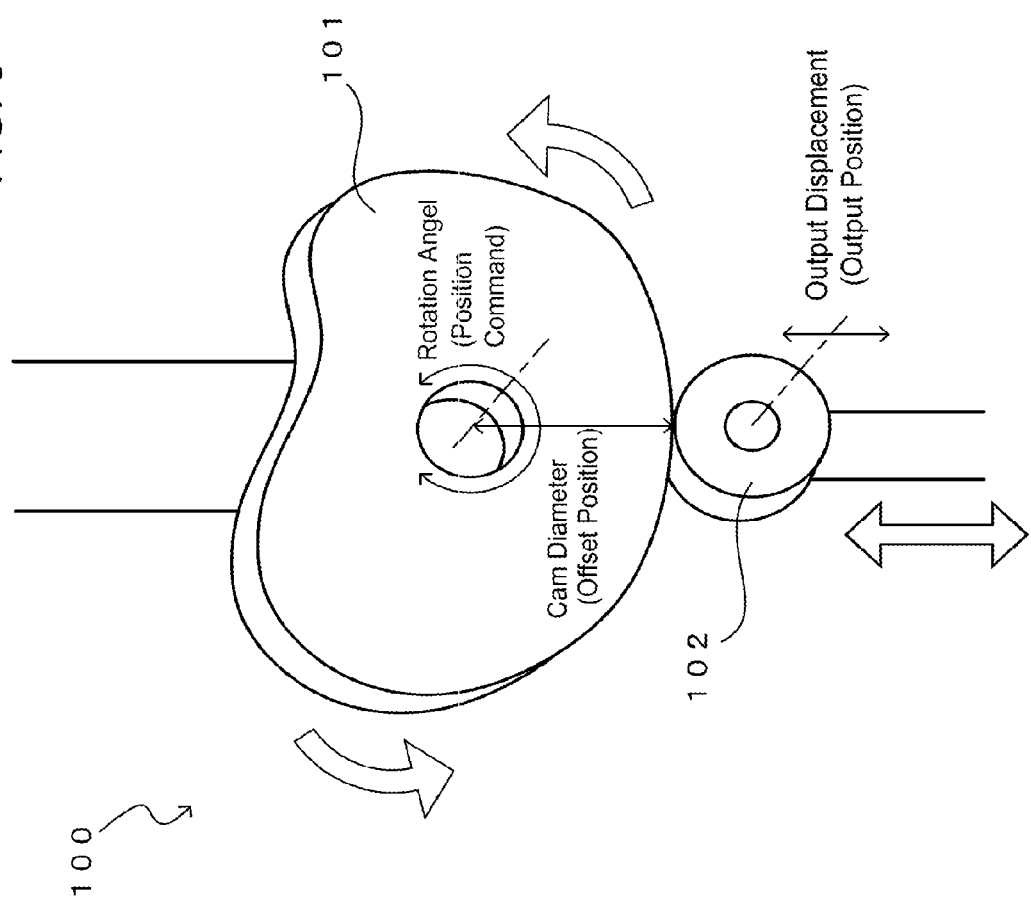

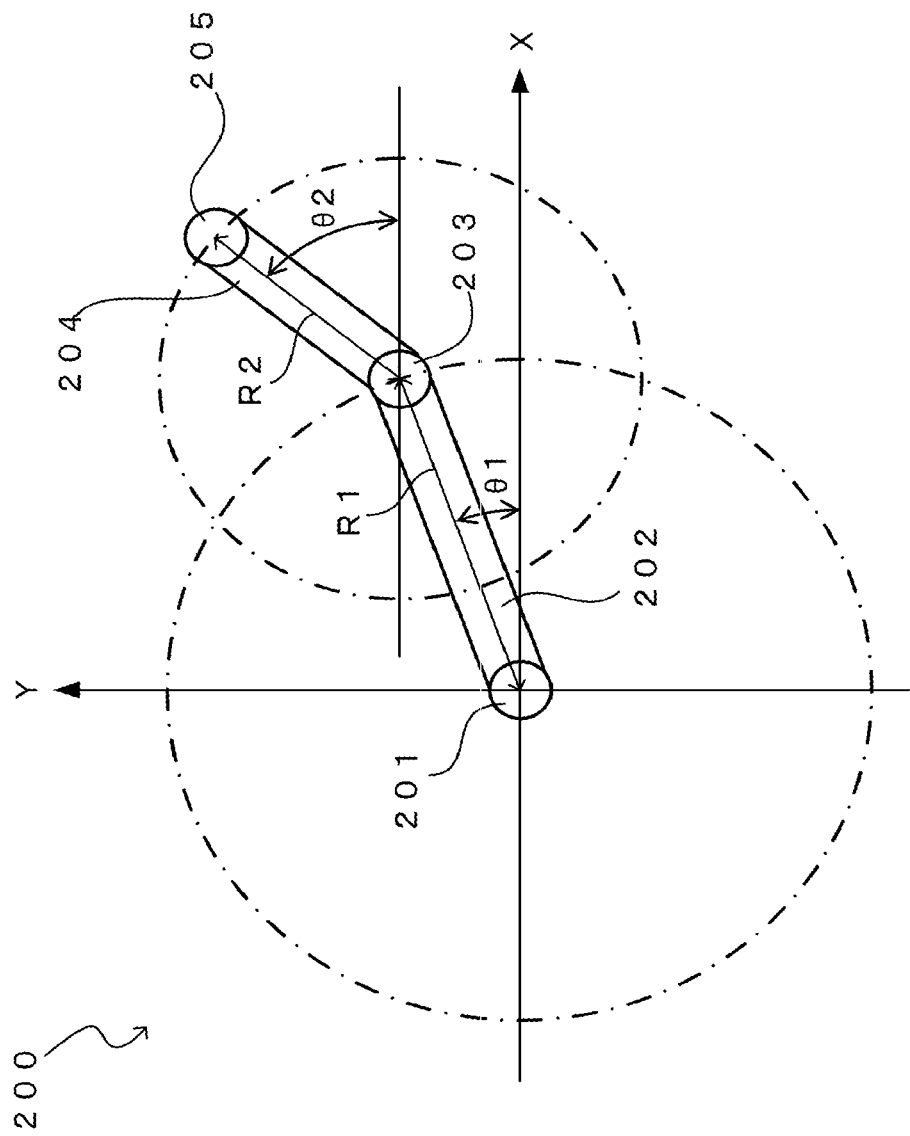

US 10,429,815 B2

MOTOR CONTROL DEVICE, POSITION CONTROL SYSTEM, AND MOTOR CONTROL METHOD

CROSS-REFERENCE TO RELATED APPLICATIONS

The present application is based upon and claims the benefit of priority to Japanese Patent Application No. 2015-162104, filed Aug. 19, 2015, the entire contents of which are incorporated herein by reference.

BACKGROUND OF THE INVENTION

Field of the Invention

An embodiment disclosed herein relates to a motor control device, a position control system and a motor control method.

Description of Background Art

Japanese Patent No. 3860014 describes a positioning control device in which, in synchronous positioning control between multiple axes, one CPU respectively outputs, to respective positioning controllers of the axes, position commands that reflect interaxial position corrections. The entire contents of this publication are incorporated herein by reference.

SUMMARY OF THE INVENTION

According to one aspect of the present invention, a motor control device for controlling driving of a motor based on position commands input from a host control device includes an offset value memory including first circuitry which stores offset values corresponding to predetermined values of position commands, respectively, and a drive controller including second circuitry which acquires, from the offset value memory, one of the offset values corresponding to an input position command among the position commands, and control driving of a motor based on an offset position command obtained by adding the one of the offset values to or subtracting the one of the offset values from the input position command.

According to another aspect of the present invention, a position control system includes motors which control a position control machines, a host control device including circuitry which inputs position commands, and motor control devices each including circuitry which controls driving of a respective one of the motors based on the position commands input from the host control device. Each of the motor control devices includes an offset value memory including first circuitry which stores offset values corresponding to predetermined values of the position commands, respectively, and a drive controllers including second circuitry which acquires, from the offset value memory, one of the offset values corresponding to an input position command among the position commands, and control driving of the respective one of the motors based on an offset position command obtained by adding the one of the offset values to or subtracting the one of the offset values from the input position command.

According to yet another aspect of the present invention, a method for controlling driving of a motor based on a position command input from a host control device includes acquiring an offset value corresponding to an input position command, and controlling driving of a motor based on an offset position command obtained by adding the offset value to or subtracting the offset value from the input position command.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 schematically illustrates an example of a correction value table;

FIG. 8 illustrates an electronic cam for describing a concept of offset position control; and FIG. 9 illustrates a dual rotary drive mechanism for describing a concept of coordinate change control.

DETAILED DESCRIPTION OF THE EMBODIMENTS

Figure 1:
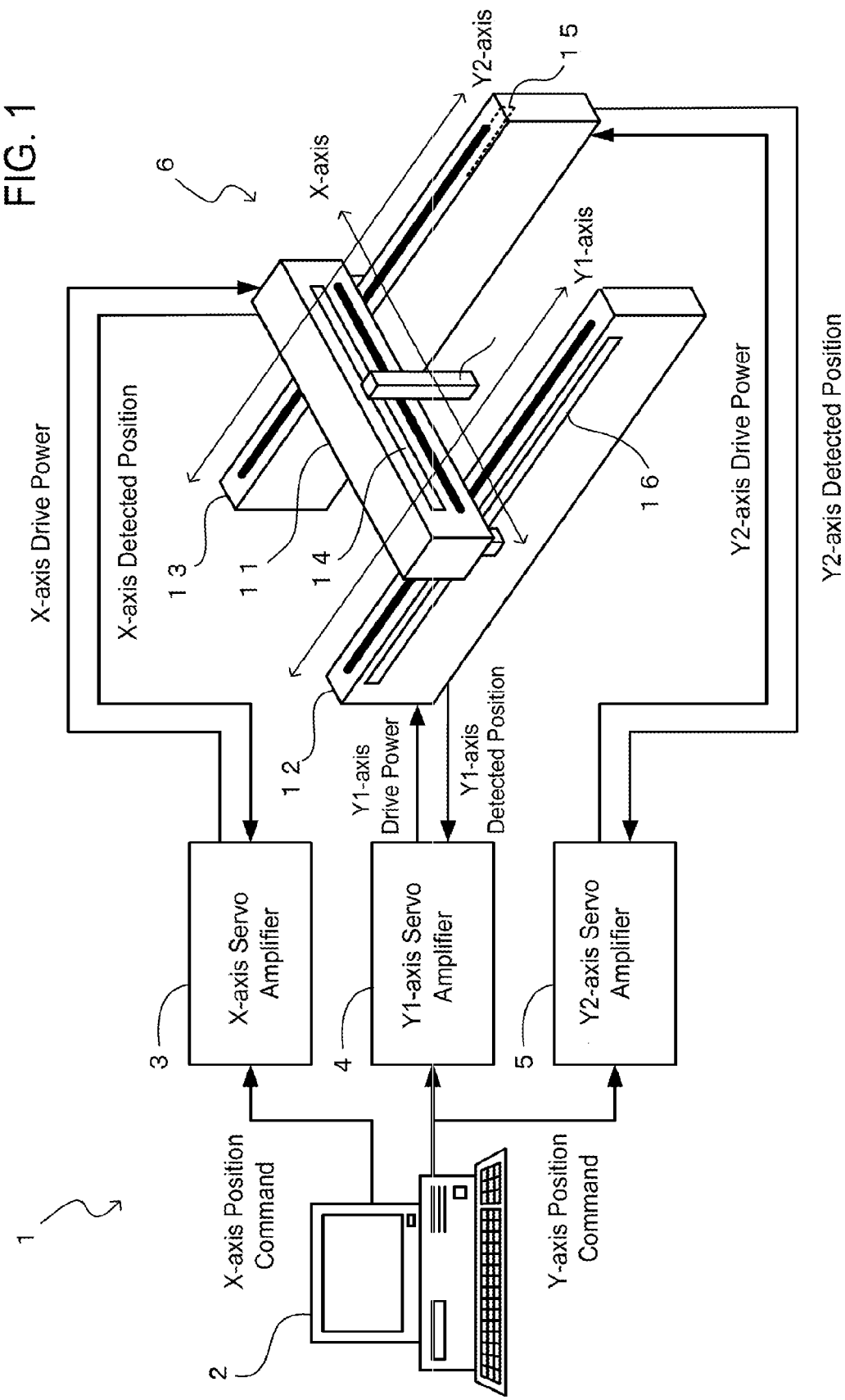
FIG. 1 illustrates a block diagram of a position control system that is provided with a motor control device of an embodiment.

The embodiments will now be described with reference to the accompanying drawings, wherein like reference numerals designate corresponding or identical elements throughout the various drawings.

Positioning Control System

FIG. 1 illustrates a block diagram of a position control system that is provided with a motor control device of the present embodiment. In FIG. 1, a position control system 1 includes a general-purpose personal computer 2 (hereinafter, referred to as a general-purpose PC) that performs control of the entire position control system 1, three servo amplifiers (3, 4, 5), and a position control machine 6.

The general-purpose PC 2 (host control device) is a common personal computer that is provided with a CPU, a ROM, a RAM, a HDD, a communication controller, an operation part and a display (which are not particularly illustrated in the drawings). Based on various programs and data stored in the ROM, the RAM, the HDD and the like, the CPU outputs a position command to each of the servo amplifiers (3, 4, 5) (to be described later).

The servo amplifiers (3, 4, 5) (motor control devices) each have a computer that is provided with a CPU, a ROM, a RAM, a flash memory (which is a nonvolatile memory device), a communication controller, an operation part and a display (which are not particularly illustrated in the drawings), and each have a function of controlling driving of a linear motor that is provided in the position control machine 6 (to be described later) by supplying power to the linear motor based on a position command input from the general-purpose PC 2. In the example illustrated in FIG. 1, the position control machine 6 has three linear motors (11, 12, 13), and the three servo amplifiers (3, 4, 5) are respectively provided corresponding to the linear motors (11, 12, 13).

The position control machine 6 has a Y1-axis linear motor 12 and a Y2-axis linear motor 13, which are arranged in parallel, and has an X-axis linear motor 11 that is provided in a form of a doubly supported beam extending across between movers of the Y1-axis linear motor 12 and the Y2-axis linear motor 13, and as a whole, the position control machine 6 has a so-called gantry structure. The Y1-axis and Y2-axis linear motors (12, 13) are arranged such that their respective linear movable ranges of the same length are parallel to a Y-axis direction and completely overlap each other, and are synchronously position-controlled such that their respective movers move at the same position in the Y-axis direction. The X-axis linear motor 11 is arranged extending in an X-axis direction. The entire X-axis linear motor 11 moves in the Y-axis direction due to driving of the Y1-axis and Y2-axis linear motors (12, 13), and a mover of the X-axis motor 11 is caused to move in the X-axis direction.

The three linear motors (11, 12, 13) are respectively provided with linear scales (14, 15, 16) for detecting axial direction positions of the movers of the linear motors (11, 12, 13). The linear motors (11, 12, 13) are respectively fed with driving power from the corresponding servo amplifiers (3, 4, 5) to drive positions of the movers, and the linear scales (14, 15, 16) respectively input detected positions of the movers to the corresponding servo amplifiers (3, 4, 5). The general-purpose PC 2 inputs an X-axis position command to the X-axis servo amplifier 3, and inputs a common Y-axis position command to the Y1-axis and the Y2-axis servo amplifiers (4, 5). By referring to the respective input detected positions, the servo amplifiers (3, 4, 5) control driving power such that the positions of the movers of the corresponding linear motors (11, 12, 13) follow and match the position commands. By having the above-described structure, the position control system 1 of the present embodiment can control an X-Y coordinate position of an end effector 17 that is provided on the mover of the X-axis linear motor in correspondence to the X-axis position command and the Y-axis position command that are output by the general-purpose PC 2.

Embodiment

Figure 2:
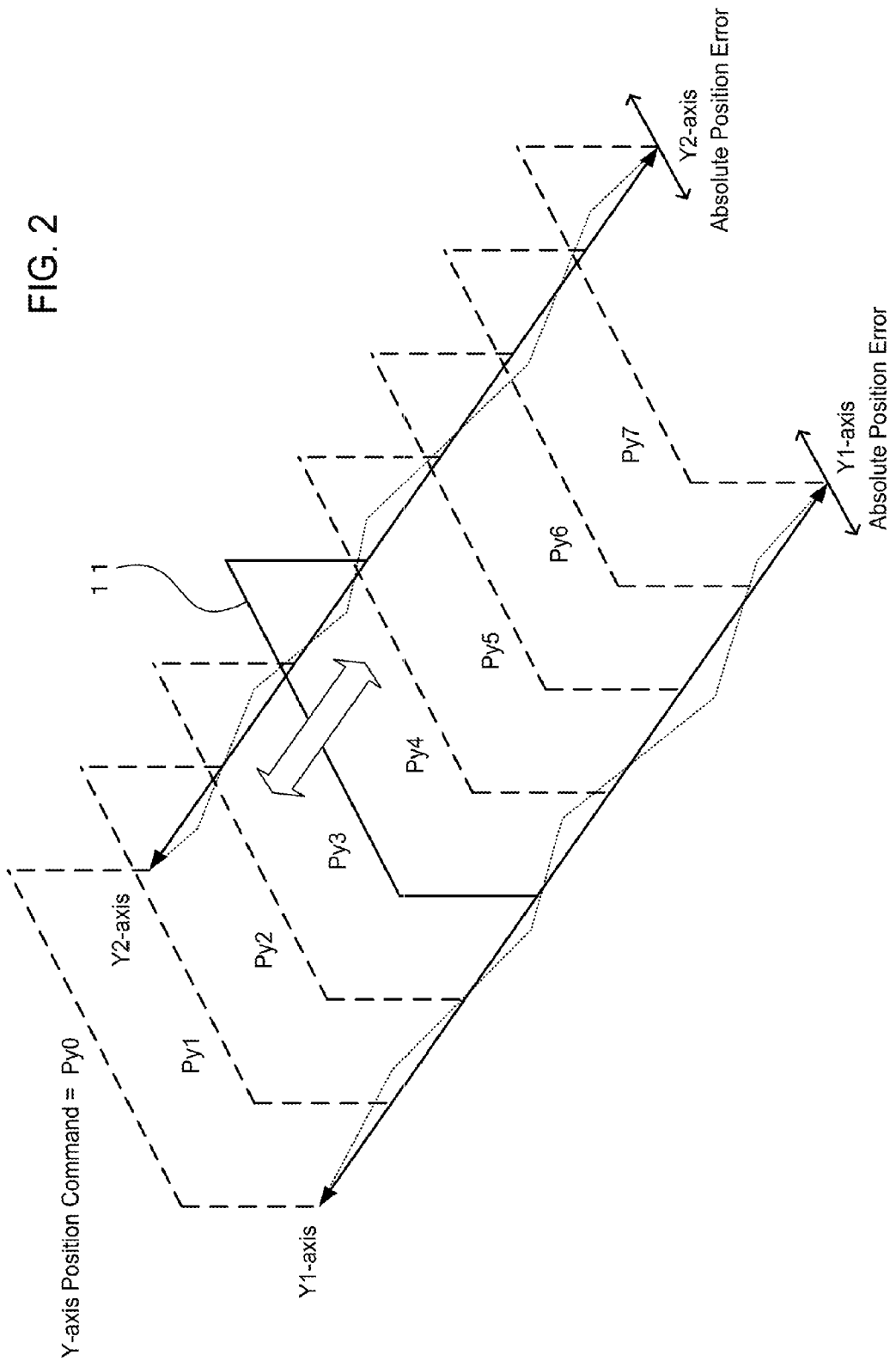
FIG. 2 schematically illustrates movement of an entire X-axis linear motor that is a Y-axis direction movable part of a position control machine.

However, even in the position control system 1 having the above-described structure, it is difficult to perform drive control with a high precision of an order of μm. For example, due to an assembly error such as a distortion occurring near a fixation place of a screw or a bolt in an installation structure of the linear scales (14, 15, 16) or a manufacturing error such as straightness of the X-axis linear motor 11, it is difficult to ensure absolute accuracy in each part of the position control machine 6, which is an assembling structure. Therefore, as illustrated in FIG. 2 that schematically illustrates movement of the entire X-axis linear motor 11 which is a Y-axis direction movable part of the position control machine 6, for example, absolute position errors in an order of μm locally or generally occur in the detected positions of the linear scales (15, 16) of the respective Y1 and Y2 axes. In this case, even when the detected positions of the linear scales (15, 16) indicate the same position according to data of the detected positions, mechanically, the position control has resulted in different Y-axis direction positions, and this causes the entire position control machine 6 to bend or induces vibration.

In order to address such errors in mechanism or in control of the position control machine 6, it is possible to adopt a method in which the servo amplifiers (4, 5) control the linear motors (12, 13) using correction positions (offset positions) that are shifted by predetermined correction values (offset values) with respect to originally input position commands. Such correction values are nonlinear irregular values corresponding to values of the position commands that vary within a predetermined range, and are often an array of numerical values that cannot be simply calculated using a specific arithmetic expression and are unique to the position control machine 6.

In a case where the general-purpose PC 2 that is a host control device generates and outputs position commands that reflect such irregular correction values, large memory capacity and high-speed arithmetic processing capability are required, and thus a sophisticated general-purpose PC 2 is required, causing an increase in manufacturing cost of the entire position control system 1. In particular, as in the present embodiment, in the case where multiaxial synchronous control of simultaneously controlling the multiple linear motors (11, 12, 13) and the multiple servo amplifiers (3, 4, 5) is performed using one general-purpose PC 2, load due to multiplexing of processing is increased, and an even more sophisticated general-purpose PC 2 is required.

In contrast, in the present embodiment, the Y2-axis servo amplifier 5 is provided with a correction value table memory that stores correction values corresponding to predetermined values of the Y-axis position command. The Y2-axis servo amplifier 5 acquires an interaxial correction value corresponding to an input Y-axis position command from the correction value table memory, and controls driving of the Y2-axis linear motor 13 based on a Y2-axis correction position command that is obtained by adding the interaxial correction value to the input Y-axis position command. As a result, the processing of controlling an output position of the Y2-axis linear motor 13 using a correction position corresponding to a predetermined value of an original Y-axis position command can be shared on the Y2-axis servo amplifier 5 side, and a processing load of the general-purpose PC 2 can be reduced.

Servo Amplifier

Figure 3:
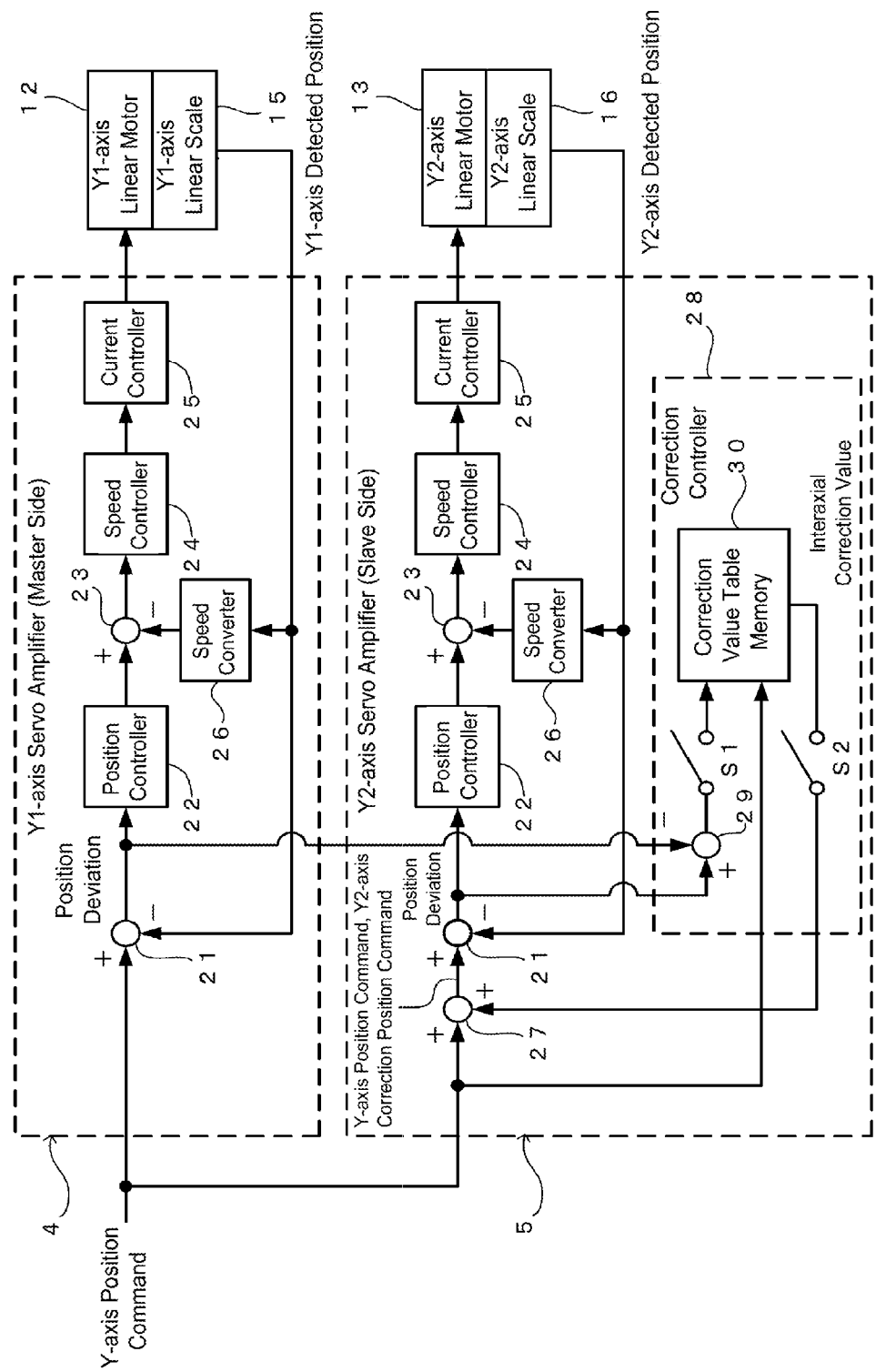
FIG. 3 illustrates control blocks of a Y1-axis servo amplifier and a Y2-axis servo amplifier in a transfer function form.

FIG. 3 illustrates control blocks of the Y1-axis servo amplifier 4 and the Y2-axis servo amplifier 5 in the present embodiment in a transfer function form. In the example of the present embodiment, the control blocks illustrated in FIG. 3 are realized using software programs that are executed by CPUs that are provided in the servo amplifiers (4, 5).

In FIG. 3, the Y1-axis servo amplifier 4 has a subtractor 21, a position controller 22, a subtractor 23, a speed controller 24, a current controller 25, and a speed converter 26. The subtractor 21 subtracts a Y1-axis detected position (to be described later) from the Y-axis position command that is input from the general-purpose PC 2 and outputs a position deviation. Based on the position deviation, the position controller 22 outputs a speed command. The subtractor 23 subtracts a Y1-axis detected speed (to be described later) from the speed command and outputs a speed deviation. Based on the speed deviation, the speed controller 24 outputs a torque command. Based on the torque command, the current controller 25 outputs a Y1-axis drive current and power-feeds the external Y1-axis linear motor 12. Then, the Y1-axis linear scale 15 detects a drive position of the Y1-axis linear motor 12, and inputs the detected drive position as a Y1-axis detected position (output position of the motor) to the Y1-axis servo amplifier 4. The Y1-axis detected position is subtracted from the Y-axis position command at the subtractor 21, and is input to the speed converter 26. Based on the Y1-axis detected position, the speed converter 26 outputs a Y1-axis detected speed, which is a drive speed of the Y1-axis linear motor 12. The speed converter 26 may be formed using a differentiator or the like that differentiates the Y1-axis detected position with respect to time.

In the above, the subtractor 21, the position controller 22, the subtractor 23, the speed controller 24, the current controller 25 and the speed converter 26, together with the external Y1-axis linear motor 12 and Y1-axis linear scale 15, form a so-called double feedback loop that includes a position control feedback loop and a speed control feedback loop. A current control feedback loop is provided inside the current controller 25, but is omitted in FIG. 3.

On the other hand, the Y2-axis servo amplifier 5 has the same double feedback loop as the Y1-axis servo amplifier 4, and has an adder 27 and a correction controller 28. The adder 27 adds an interaxial correction value (to be described later) to the Y-axis position command that is input from the general-purpose PC 2 and outputs the result as a Y2-axis correction position command (offset position command) to the subtractor 21.

The correction controller 28 has a subtractor 29, a storage switch (S1), an acquisition switch (S2), and a correction value table memory 30. The Y-axis position command that is input from the general-purpose PC 2, the position deviation of the position feedback loop in the Y1-axis servo amplifier 4, and the position deviation of the position feedback loop in the Y2-axis servo amplifier 5 are input to the correction controller 28. Information transmission and reception of the position deviation from the Y1-axis servo amplifier 4 may be performed over a communication network such as a MECHATROLINK (registered trademark).

The subtractor 29 subtracts the position deviation of the position feedback loop in the Y1-axis servo amplifier 4 from the position deviation of the position feedback loop in the Y2-axis servo amplifier 5, and outputs the difference. The storage switch (S1) switches between inputting and not inputting the difference to the correction value table memory 30. The Y-axis position command that is input from the general-purpose PC 2 is always input to the correction value table memory 30.

The correction value table memory 30 stores therein a correction value table (see FIG. 5 to be described later), and, when the difference between the position deviations is input together with the Y-axis position command, the input difference between the position deviations is stored as an interaxial correction value (offset value) in association with the Y-axis position command in the correction value table. Further, when only the Y-axis position command is input to the correction value table memory 30, in correspondence to the input Y-axis position command, an interaxial correction value stored in the correction value table is read out and output. That is, when the storage switch (S1) is closed, the correction value table memory 30 is in a mode of storing an interaxial correction value; and when the storage switch (S1) is open, the correction value table memory 30 is in a mode of reading out and outputting an interaxial correction value. The storage switch (S1) is formed using a hardware switch (not particularly illustrated in FIG. 3) or performs switching by software parameter settings or the like.

The acquisition switch (S2) switches between inputting and not inputting, to the adder 27, the interaxial correction value that is output from the correction value table memory 30. That is, when the acquisition switch (S2) is open, the Y-axis position command that is input from the general-purpose PC 2 is input as-is to the position feedback loop; and the acquisition switch (S2) is closed, the Y2-axis correction position command that is obtained by adding the interaxial correction value to the Y-axis position command is input to the position feedback loop. The acquisition switch (S2) is formed using a hardware switch (not particularly illustrated in FIG. 3) or performs switching by software parameter settings or the like. Then, when the Y2-axis is in a relation of a master axis (to be described later), the acquisition switch (S2) is switched to open; and when the Y2-axis is in a relation of a slave axis (to be described later), the acquisition switch (S2) is switched to close. The correction value table memory 30 corresponds to an offset value memory, and to a means that stores offset values that correspond to predetermined values of position commands.

Y-Axis Direction Control in Present Embodiment

Figure 4:
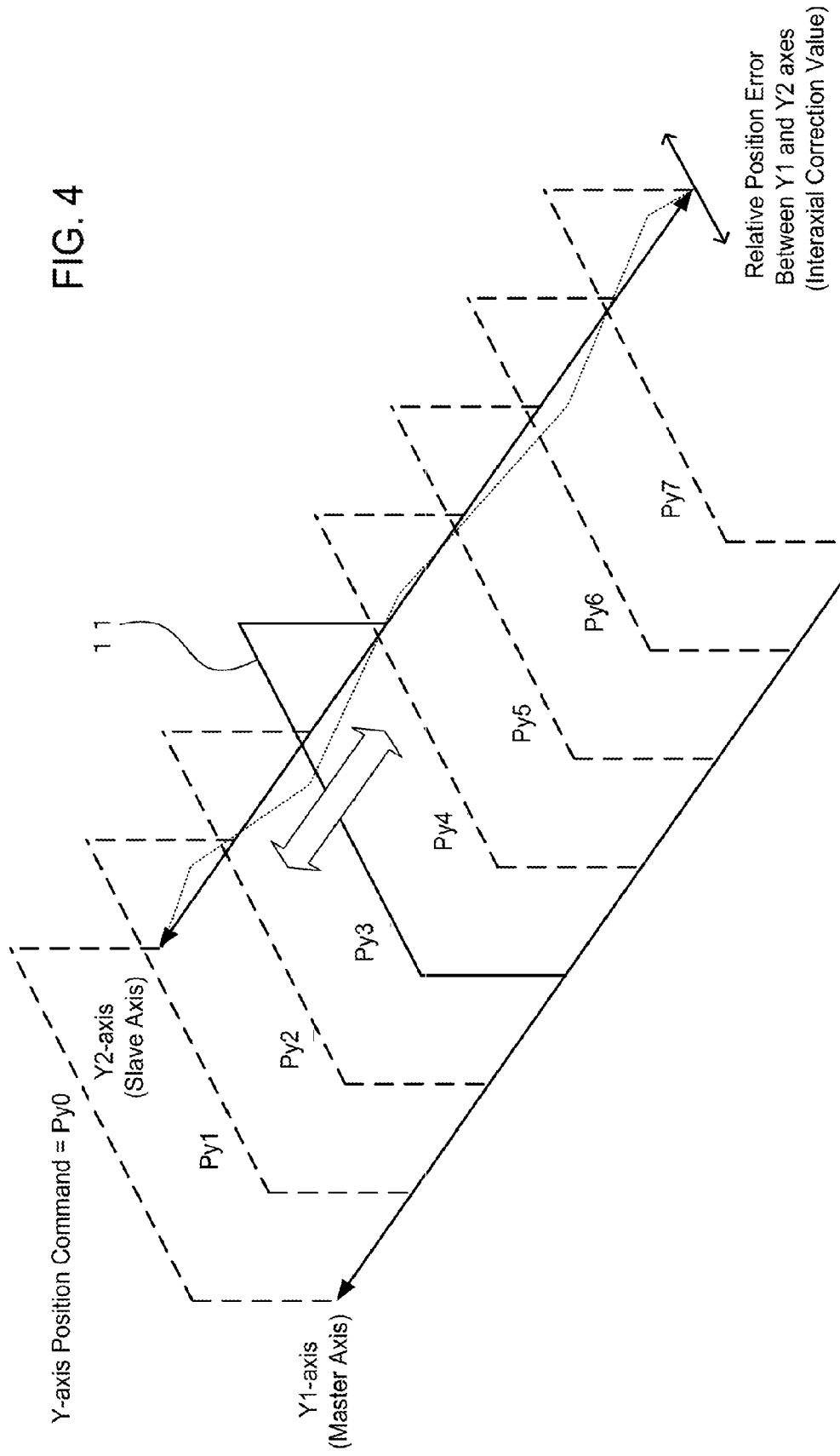
FIG. 4, corresponding to FIG. 2, illustrates a relative position error between the Y1 and Y2 axes.

By having the Y1-axis and Y2-axis servo amplifiers (4, 5) that are structured as described above, the position control system 1 of the present embodiment can perform Y-axis direction control as illustrated in FIG. 4 that corresponds to the above-described FIG. 2. That is, in correspondence to each predetermined value of the Y-axis position command, a difference obtained by subtracting a position deviation of the position feedback loop in the Y1-axis servo amplifier 4 from a position deviation of the position feedback loop in the Y2-axis servo amplifier 5 corresponds to a relative position error of the Y2-axis relative to the Y1-axis. Therefore, in the Y1-axis, position control is performed according to the Y-axis position command as-is, whereas in the Y2-axis, the position control is performed according to above-described Y2-axis correction position command, that is, the position command that has been corrected by adding an interaxial correction value (interaxial relative position error) to the Y-axis position command. Thereby, high precision multi-axial synchronous position control is possible in which at least an interaxial relative position error between the Y1 and Y2 axes is offset.

From a point of view of the synchronous position control between two axes as described above, the Y2-axis is subordinate to the Y1-axis. That is, the Y1-axis functions as a master axis, and the Y2-axis functions as a slave axis. The above-described acquisition switch (S2) is selectively set in advance to be in a closed state or in an open state based on a master-slave relation between one axis and the other axis when the Y-axis servo amplifiers (4, 5) are incorporated into the position control system 1. In the example of the present embodiment, the acquisition switch (S2) of the Y2-axis servo amplifier 5 is fixedly set to be in a closed state in correspondence to a slave axis.

Further, depending on movable distances of the Y-axis linear motors (12, 13) in the position control machine 6 and resolutions of the Y-axis linear scales (15, 16), a variation range and a sampling number of the values of the Y-axis position commands that the general-purpose PC 2 outputs increases or decreases. However, when the correction value table memory 30 stores all of the interaxial correction values that respectively correspond to all of the values that the Y-axis position commands can take, a memory size of the correction value table memory 30 becomes huge. Therefore, in the present embodiment, as in the correction value table illustrated in FIG. 5, interaxial correction values that correspond only to values of the Y-axis position commands that correspond to integer (including 0) multiples of 10 (which are 0, 10, 20, . . . in the example illustrated in FIG. 5; which are referred to as 10-multiple values hereinafter) are stored. In this way, by storing only the interaxial correction values that correspond to discrete values of the position command at a predetermined interval, the memory size of the correction value table can be significantly reduced (in the example illustrated in FIG. 5, the memory size is reduced to one tenth of the original size). The correction value table is stored in a nonvolatile memory such as a flash memory that is provided in the Y2-axis servo amplifier 5. When an interaxial correction value is acquired from the correction value table, an interpolation value may be calculated based on interaxial correction values that correspond to 10-multiple values immediately before and after the value of the input Y-axis position command (details will be described later).

From the above, in the position control system 1 of the present embodiment, separate from a normal position control process with respect to the position control machine 6, a process is required in which relative position errors between the Y1 and Y2 axes corresponding to predetermined values of the Y-axis position commands are detected in advance in the position control machine 6, and the relative position errors are stored as the interaxial correction values in the correction value table. The above-described 10-multiple values correspond to predetermined values of position commands.

Figure 6:
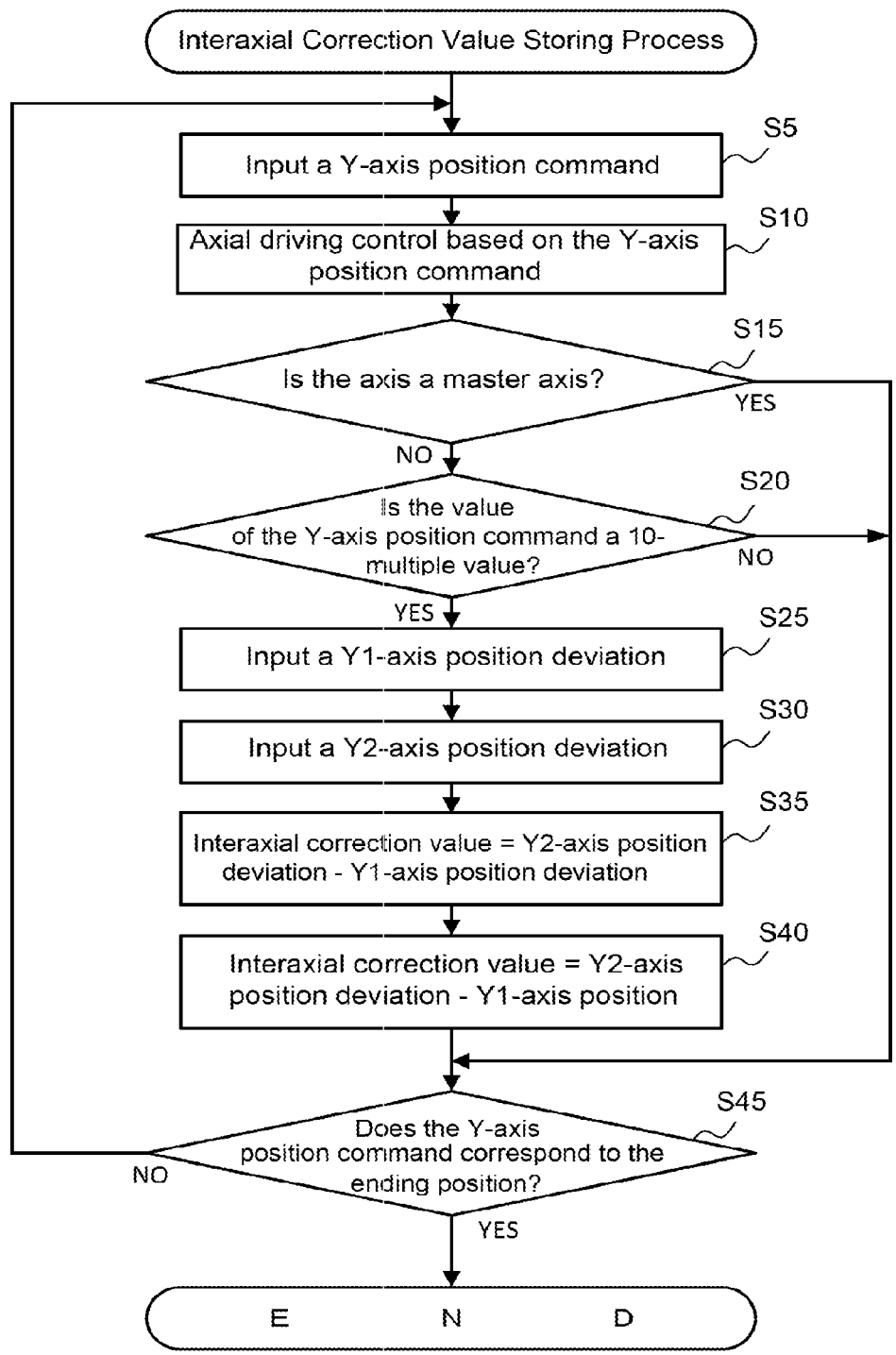
FIG. 6 is a flowchart illustrating control procedures of an interaxial correction value storing process executed by a CPU of a Y2-axis servo amplifier.

Control Flow of Interaxial Correction Value Storing Process Executed by Y2-Axis Servo Amplifier Control procedures of an interaxial correction value storing process that are executed by the CPU (not illustrated in the drawings) of the Y2-axis servo amplifier 5 in order to realize the process of storing the above-described interaxial correction values are described step by step using FIG. 6. In FIG. 6, the process illustrated in the flow starts execution when the correction value table memory 30 is in the mode of storing interaxial correction values, in a state in which the storage switch (S1) is closed in advance by an operation of a hardware switch or parameter settings or the like. During the execution of the interaxial correction value storing process, Y-axis position commands of increasing values from a starting position to an ending position corresponding to the movable range in the Y-axis direction of the position control machine 6 are sequentially continuously output from the general-purpose PC 2.

First, at a process (S5), the CPU of the Y2-axis servo amplifier 5 inputs a Y-axis position command from the general-purpose PC 2.

Next, the processing proceeds to a process (S10), at which the CPU of the Y2-axis servo amplifier 5 controls driving of the Y2-axis linear motor 13 based on the Y-axis position command as-is that is input at the process (S5). This is performed by inputting the Y-axis position command as-is to the double feedback loop in the Y2-axis servo amplifier 5.

Next, the processing proceeds to a process (S15), at which the CPU of the Y2-axis servo amplifier 5 determines whether or not the Y2-axis that the servo amplifier drives and controls is a master axis. In other words, the CPU of the Y2-axis servo amplifier 5 determines whether or not the acquisition switch (S2) is set to be in the open state. When the Y2-axis is a master axis, the determination is satisfied, and the processing proceeds to a process (S45) to be described later.

On the other hand, when the Y2-axis is a slave axis, the determination is not satisfied, and the processing proceeds to a process (S20).

At the process (S20), the CPU of the Y2-axis servo amplifier 5 determines whether or not the value of the Y-axis position command that is input at the process (S5) is a 10-multiple value. This may be performed by determining whether or not a remainder from a division of the value of the Y-axis position command by 10 is 0, or by determining whether or not a value obtained by dividing the value of the Y-axis position command by 10 and truncating the result after the decimal point and thereafter further multiplying the result by 10 is the same as the original value of the Y-axis position command. When the value of the input Y-axis position command is not a 10-multiple value, the determination is not satisfied and the processing proceeds to the process (S45) to be described later.

On the other hand, when the value of the input Y-axis position command is a 10-multiple value, the determination is satisfied and the processing proceeds to a process (S25).

At the process (S25), the CPU of the Y2-axis servo amplifier 5 inputs a Y1-axis position deviation from the position control feedback loop in the servo amplifier 4 of the Y1-axis that is the master axis.

Next, the processing proceeds to a process (S30), at which the CPU of the Y2-axis servo amplifier 5 inputs a Y2-axis position deviation from the position control feedback loop in the servo amplifier (the Y2-axis servo amplifier 5) of the Y2-axis that is the slave axis.

Next, the processing proceeds to a process (S35), at which the CPU of the Y2-axis servo amplifier 5 obtains an interaxial correction value of the Y2-axis with respect to the Y1-axis by subtracting the Y1-axis position deviation that is input at the process (S25) from the Y2-axis position deviation that is input at the process (S30).

Next, the processing proceeds to a process (S40), at which the CPU of the Y2-axis servo amplifier 5 stores, in the correction value table, the interaxial correction value that is calculated at the process (S35) in association with the Y-axis position command that is input at the process (S5).

Next, the processing proceeds to the process (S45), at which the CPU of the Y2-axis servo amplifier 5 determines whether or not the value of the Y-axis position command that is input at the process (S5) is a value that corresponds to the ending position of the Y-axis direction movable range of the position control machine 6. When the value of the Y-axis position command is not a value corresponding to the ending position, the determination is not satisfied, and the processing returns to the above process (S5) and the same procedures are repeated.

On the other hand, when the value of the Y-axis position command is a value corresponding to the ending position, the determination is satisfied, and the flow is ended.

By executing the above described interaxial correction value storing process, the Y2-axis servo amplifier 5 can store in the correction value table the interaxial correction values that respectively correspond to the Y-axis position commands at intervals of 10 over the entire Y-axis direction movable range of the position control machine 6. During the execution of the interaxial correction value storing process, the Y1-axis servo amplifier 4 of the master axis repeatedly executes only the procedures of the processes (S5, S10, S45). Further, it is also possible that the Y2-axis servo amplifier 5 also only repeatedly executes the procedures of the processes (S5, S10, S45), and an application program that is executed on the general-purpose PC 2 repeatedly executes the procedures of the processes (S20, S25, S30, S35, S40) and stores the interaxial correction values on the general-purpose PC 2. In this case, after all of the interaxial correction values are stored, the Y-axis position commands of the 10-multiple values and the corresponding interaxial correction values are transmitted from the general-purpose PC 2 and are stored in the correction value table of the Y2-axis servo amplifier 5.

Further, in the above-described interaxial correction value storing process, in specifying the Y-axis position commands for which the interaxial correction values are to be stored in the correction value table, the 10-multiple values at intervals of 10 over the entire Y-axis direction movable range of the position control machine 6 are all specified in ascending order. However, the present invention is not limited to this. For example, in specifying the Y-axis position commands for which the interaxial correction values are to be stored in the correction value table, it is also possible to specify discrete values at intervals other than 10, or to specify any values other than discrete values at predetermined intervals, or to specify values in any range within the Y-axis direction movable range, or to specify the values in an ascending, descending or any order. Further, it is also possible to allow the interaxial correction values corresponding to the specified Y-axis position commands to be arbitrarily set and stored by operation of a user. As described above, when the Y-axis position commands and the interaxial correction values that are stored in the correction value table are specified and set with a high degree of freedom, it is also possible that the Y-axis position commands and the interaxial correction values are not automatically specified and set on the Y2-axis servo amplifier 5 side, but can be arbitrarily specified and set by operation of a user on the general-purpose PC 2.

Control Flow of Position Control Process Executed by Y2-Axis Servo Amplifier

Figure 7:
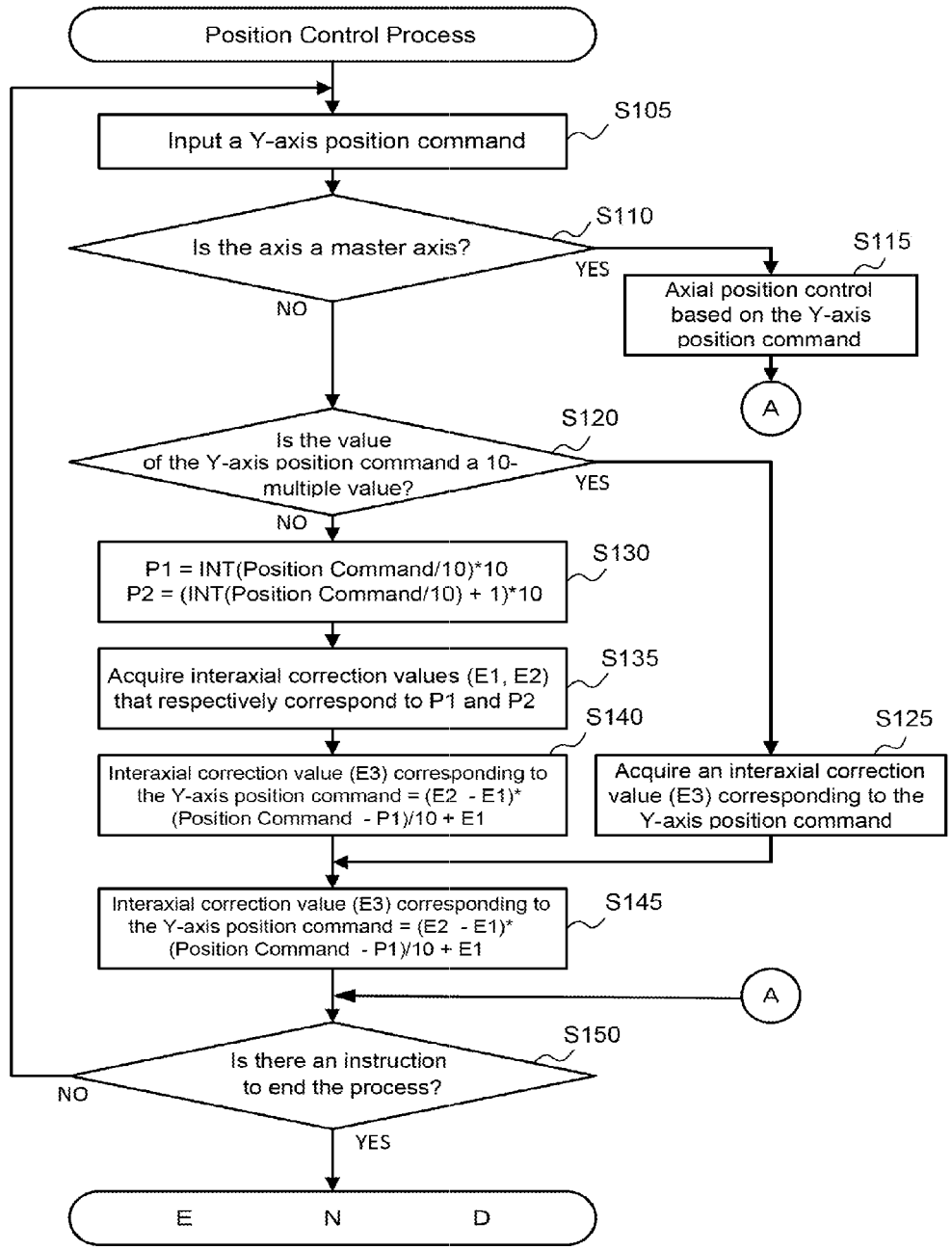
FIG. 7 is a flowchart illustrating control procedures of a position control process executed by the CPU of the Y2-axis servo amplifier.

Next, control procedures of a position control process that are executed by the CPU (not illustrated in the drawings) of the Y2-axis servo amplifier 5 during normal position control of the position control machine 6 are described step by step using FIG. 7. In FIG. 7, the process illustrated in the flow starts execution when the storage switch (S1) is open, the correction value table memory 30 is in a mode of reading out and outputting the interaxial correction values, and the entire position control system 1 is activated. During the execution of the position control process, a Y-axis position command of an arbitrary value is output from the general-purpose PC 2.

First, at a process (S105), the CPU of the Y2-axis servo amplifier 5 inputs a Y-axis position command from the general-purpose PC 2.

Next, the processing proceeds to a process (S110), at which the CPU of the Y2-axis servo amplifier 5 determines whether or not the Y2-axis servo amplifier 5 drives and controls is a master axis. In other words, the CPU of the Y2-axis servo amplifier 5 determines whether or not the acquisition switch (S2) is set to be in the open state. When the Y2-axis is a master axis, the determination is satisfied, and the processing proceeds to a process (S115).

At the process (S115), the CPU of the Y2-axis servo amplifier 5 controls driving of the Y2-axis linear motor 13 based on the Y-axis position command as-is that is input at the process (S105). This is performed by inputting the Y-axis position command as-is to the double feedback loop in the Y2-axis servo amplifier 5. Then, the processing proceeds to a process (S150) to be described later.

On the other hand, at the determination of the process (S110), when the Y2-axis is a slave axis, the determination is not satisfied, and the processing proceeds to a process (S120).

At the process (S120), the CPU of the Y2-axis servo amplifier 5 determines whether or not the value of the Y-axis position command that is input at the process (S105) is a 10-multiple value. When the value of the input Y-axis position command is a 10-multiple value, the determination is satisfied and the processing proceeds to a process (S125).

At the process (S125), the CPU of the Y2-axis servo amplifier 5 acquires from the correction value table an interaxial correction value (E3) that corresponds to the Y-axis position command that is input at the process (S105), and the processing proceeds to a process (S145) to be described later.

On the other hand, at the determination of the process (S120), when the value of the input Y-axis position command is not a 10-multiple value, the determination is not satisfied, the processing proceeds to a process (S130).

At the process (S130), the CPU of the Y2-axis servo amplifier 5 calculates two 10-multiple values (P1, P2) that correspond to 10-multiple values immediately before and after the value of Y-axis position command that is input at the process (S105). Specifically, a 10-multiple value (P1) lower than the value of the Y-axis position command is obtained by dividing the Y-axis position command (abbreviated as "position command" in FIG. 7) by 10, truncating the result after the decimal point and further multiplying the result by 10 (in FIG. 7, "INT (*)" is a function that makes an argument (*) an integer). Further, a 10-multiple value (P2) higher than the value of the Y-axis position command is obtained by dividing the Y-axis position command (abbreviated as "position command" in FIG. 7)) by 10, truncating the result after the decimal point, adding 1 to the result, and further multiplying the result by 10.

Next, the processing proceeds to a process (S135), at which the CPU of the Y2-axis servo amplifier 5 acquires from the correction value table two interaxial correction values (E1, E2) that respectively correspond to the two 10-multiple values (P1, P2) that are calculated at the process (S130).

Next, the processing proceeds to a process (S140), at which the CPU of the Y2-axis servo amplifier 5 obtains an interaxial correction value (E3) that corresponds to the Y-axis position command that is input at the process (S105) as an interpolation value of the interaxial correction values (E1, E2) that respectively correspond to the two 10-multiple values (P1, P2). Specifically, the interaxial correction value (E3) is obtained from E3=(E2−E1)×(Y-axis position command−P1)/10+E1, which is an interpolation value calculation formula.

Next, the processing proceeds to the process (S145), at which the CPU of the Y2-axis servo amplifier 5 controls driving of the Y2-axis linear motor 13 based on the Y2-axis correction position command that is obtained by adding the interaxial correction value (E3) to the Y-axis position command that is input at the process (S105). This is performed by inputting to the double feedback loop in the Y2-axis servo amplifier 5 the Y2-axis correction position command generated at the adder 27 by adding the interaxial correction value (E3) to the Y-axis position command (see the above-described FIG. 3).

Next, the processing proceeds to a process (S150), at which the CPU of the Y2-axis servo amplifier 5 determines whether or not an instruction to end the position control process has been input from the general-purpose PC 2. When an ending instruction has not been input, the determination is not satisfied, and the processing returns to the above process (S105) and the same procedures are repeated. On the other hand, when an ending instruction has been input, the determination is satisfied, and the flow is ended.

By executing the above-described position control process, the Y2-axis servo amplifier 5, with respect to an input Y-axis position command of any value, when the value of the Y-axis position command is a 10-multiple value, directly acquires a corresponding interaxial correction value (E3) from the correction value table, and, when the value of the Y-axis position command is not a 10-multiple value, calculates an interpolation value from interaxial correction values that correspond to 10-multiple values immediately before and after the Y-axis position command and obtains an interaxial correction value (E3) corresponding to the Y-axis position command. Then, by driving and controlling the Y2-axis linear motor 13 based on the Y2-axis correction position command that has reflected the interaxial correction value (E3), high precision synchronous position control between the Y1-axis linear motor 12 and the Y2-axis linear motor 13 can be performed in which relative position errors between the Y1 and Y2-axes are offset. During the execution of the position control process, the Y1-axis servo amplifier 4 of the master axis only needs to repeatedly execute the procedures of the processes (S105, S115, S150). The entire flow of the position control process of FIG. 7 corresponds to a drive controller, and corresponds to a means that controls driving a motor to a position that is offset from an input position command by an offset value that is acquired from an offset value memory corresponding to the input position command. Further, the procedure of the process (S110) corresponds to a determination part.

Further, in the procedure of the process (S150) in the above-described position control process, the end of the process is determined based on presence of absence of an input of an instruction from the general-purpose PC 2 to end the position control process. However, without being limited to this, determination of the end of the process may also be performed based on other criteria. For example, in a case where the correction value table that is stored in the correction value table memory 30 is created corresponding to only a partial range of the Y-axis direction movable range of the position control machine 6, it may be determined to end the position control process when a value of a Y-axis position command that is input from the general-purpose PC 2 is a value outside the partial range of the correction value table.

Effects of the Present Embodiment

As described above, according to the Y2-axis servo amplifier 5 that is provided in the position control system 1 of the present embodiment, the Y2-axis servo amplifier 5 is provided with the correction value table memory 30 that stores interaxial correction values that correspond to predetermined values (10-multiple values) of Y-axis position commands, and executes a position control process in which the Y2-axis servo amplifier 5 acquires from the correction value table memory 30 an interaxial correction value that corresponds to an input Y-axis position command and controls driving of the Y2-axis linear motor 13 based on a Y2-axis correction position command that is obtained by adding the interaxial correction value to the input Y-axis position command. As a result, the processing of controlling an output position of the Y2-axis linear motor 13 using a correction position corresponding to a predetermined value of an original Y-axis position command can be shared on the Y2-axis servo amplifier 5 side, and the processing load of the general-purpose PC 2 can be reduced. As a result, an increase in manufacturing cost of the entire position control system 1 including the general-purpose PC 2 can be suppressed. Instead of the general-purpose PC 2, a so-called PLC (Programmable Logic Controller) or motion controller capable of outputting the same X-axis position command and Y-axis position command may also be applied as a host control device. Further, by reversing the sign of the interaxial correction value by subtracting the Y1-axis position deviation from the Y2-axis position deviation, and by subtracting the interaxial correction value from the Y-axis position command, the same Y2-axis correction position command can be calculated.

Further, in general, in multiaxial synchronous position control in which multiple motors and multiple servo amplifiers are simultaneously controlled, an array of numerical values of absolute position errors of each axis is unique to the axis and such absolute position errors are often different between axes. Therefore, one axis of the multiple axes is set to be a master axis that serves as a reference, and other axes are set to be slave axes that are subordinate to the master axis. That is, in the master axis, leading control is performed based on an original position command, and in the other slave axes to which the same position command is input, dependent control is performed based on corrected position commands that have reflected relative interaxial correction values relative to the master axis. Thereby, high precision synchronous position control is possible in which relative position errors between the axes have been eliminated.

Further, in the present embodiment, in particular, based on the master-slave relation with the other servo amplifier (the Y1-axis servo amplifier 4 in this case) that is determined by the procedure of the process (S110), the Y2-axis linear motor 13 is driven and controlled by switching to one of the input Y-axis position command and the Y2-axis correction position command. As a result, the Y2-axis servo amplifier 5 can be used as a master axis or a slave axis, and thus general versatility can be improved.

In the present embodiment, in the procedure of the process (S15) or the process (S110), based on the state of the storage switch (S2) that is formed by a hardware switch or a software switch such as parameter settings, a master-slave relation between this servo amplifier (the Y2-axis servo amplifier 5 in this case) and the other servo amplifier (the Y1-axis servo amplifier 4 in this case) is determined. However, the present invention is not limited to this. For example, it is also possible to determine a master-slave relation based on various conditions such as whether or not the correction value table memory 30 is provided in the other servo amplifier, or whether or not the correction value table memory 30 is provided in this servo amplifier.

Further, in the present embodiment, in particular, the interaxial correction value is a correction value with respect to a difference between an output position of the Y2-axis linear motor 13 that the Y2-axis servo amplifier 5 controls and an output position of the Y1-axis linear motor 12 that the other Y1-axis servo amplifier 4. controls As a result, high precision synchronous position control is possible in which relative position errors (offset differences) between the master axis and the slave axis have been eliminated.

Further, in the present embodiment, in particular, the interaxial correction value is set to be a difference in position deviation between the position control feedback loops that are respectively provided in the Y2-axis servo amplifier 5 and the other Y1-axis servo amplifier 4. As a result, it is possible to set a functional interaxial correction value for which an accidental error or the like in a mechanical detector such as an encoder or a linear scale has been eliminated. It is also possible to set an interaxial correction value on a basis other than a difference in position deviation between the position control feedback loops of the two axes as described above. For example, it is also possible that, in a state in which the drive control of the Y1-axis servo amplifier 4 is stopped, the X-axis linear motor 11 is positioned at a position of a Y-axis position command by only the drive control by the Y2-axis servo amplifier 5, and an interaxial correction value is set based on a difference between a Y1-axis detected position and a Y2-axis detected position at the time. Or, it is also possible that the X-axis linear motor 11 is positioned at a position of a Y-axis position command by the drive control of both the Y1 and Y2 axes, and an interaxial correction value is set such that a difference in torque command between the position control feedback loops of the two axes at the time is minimized.

Further, in the present embodiment, in particular, the predetermined values of the Y2-axis position command that are stored in the correction value table memory 30 are discretely set at equal intervals such as the above-described 10-multiple values. In the flow of the above-described position control process, an interaxial correction value corresponding to a value of a Y2-axis position command between the 10-multiple values is obtained as an interpolation value of interaxial correction values that respectively correspond to 10-multiple values immediately before and after the value of the Y2-axis position command. In the case where interaxial correction values that respectively correspond to all of the values that the Y2-axis position command can take are all stored in the correction value table memory 30, the memory size becomes huge. However, it is often that the interaxial correction values are continuous. Therefore, even when the correction value table memory 30 stores only interaxial correction values corresponding to discrete values of Y2-axis position commands, by calculating interpolation values of the stored interaxial correction values, interaxial correction values with sufficient precision can be obtained. As a result, the memory size of the correction value table memory 30 can be reduced.

In the above embodiment, as a linear actuator of the Y-axis direction driving, a linear motor of a linear motion type is used. However, additionally, a linear actuator that combines a rotary motor and a ball screw may also be used. Further, in the above embodiment, as the position control machine 6 of multiaxial control, a control machine of a so-called gantry type is used. However, other multiaxial synchronous position control machines may also be used.

Modified Embodiments

The embodiment is not limited to the above-described content. Various modified embodiments are possible within the scope without departing from the spirit and the technical idea of the embodiment. In the following, such modified embodiments are described.

(1) Case where Arbitrary Offset Values are Stored in the Correction Value Table

In the above embodiment, the case is described where the position control system 1 performs multiaxial synchronous position control, and the correction value table memory 30 that is provided in the servo amplifier of the slave axis among the multiple axes performs interaxial correction by storing interaxial correction values. However, without being limited to this, instead of the interaxial correction values, by storing offset values that are arbitrarily set, the offset values can also be used in position conversion control by a single axis.

For example, as in a cam mechanism 100 illustrated in FIG. 8 as an example describing a concept of single-axis position conversion control, in a structure in which a driven wheel 102 is in pressing contact with an outer periphery of a disc cam 101 of which a cam diameter varies in a circumferential direction, a radial direction displacement of the driven wheel 102 variously varies depending on a rotation angle of the disc cam 101. This can be regarded as an offset position when an output displacement of the driven wheel 102 varies in correspondence to a rotation position command of the disc cam 101.

On the other hand, in the correction value table of the correction value table memory 30 that is provided in the servo amplifier, instead of the interaxial correction values, arbitrary offset values corresponding to the cam diameter values are stored. As a result, the offset position control of the servo amplifier can be applied as an electronic cam that can control output positions of a motor using arbitrary offset positions corresponding to predetermined values of input position commands.

(2) Case of Utilization as Coordinate Conversion Control

In the above-described first modified embodiment, the case is described where an embodiment of the invention is applied to control in which the input position commands are converted to the offset positions in direct one-to-one correspondence. However, without being limited to this, an embodiment of the invention can also be applied to coordinate conversion control that also reflects other parameter values.

For example, in a dual rotary drive mechanism 200 illustrated in FIG. 9 as an example describing a concept of coordinate conversion control, due to rotation of a main shaft 201, a front end part of an main arm 202 of a fixed length (R1) rotates; and further, due to rotation of a secondary shaft 203 that is provided at the front end part of the main arm 202, a front end part 205 of a secondary arm 204 of a fixed length (R2) rotates. Here, when an rotation position ($\theta 2$) of the secondary shaft 203 is an arbitrary offset position corresponding to a rotation position command ($\theta 1$) that is input to the main shaft 201, the secondary arm front end part 205 moves on a specific orbit. This can be regarded as coordinate conversion control of position coordinates of the secondary arm front end part 205 with respect to position coordinates of the main arm front end part (secondary shaft 203).

With respect to such a control machine of multiaxial synchronous position control, by applying the above-described offset position control of the servo amplifier, arbitrary coordinate conversion control can be realized. That is, by suitably setting the offset values in the correction value table, a final output position of a control machine corresponding to an input position command can be controlled to a coordinate conversion position corresponding to an intended function.

Further, in addition to those already described above, methods according to the above-described embodiment and modified embodiments may also be appropriately combined and utilized.

Correction values (correction position information) that are used in position correction may be an array of irregular numerical values that cannot be simply calculated using a specific calculation formula and may be unique to a control machine. Therefore, in the case where one CPU generates and outputs position commands by reflecting such irregular correction values, a huge memory capacity and high-speed arithmetic processing performance may be required and a CPU of such sophistication may be necessary, and this is a factor causing an increase in manufacturing cost.

A motor control device according to an embodiment of the present invention, a position control system according to an embodiment of the present invention and a motor control method according to an embodiment of the present invention allow an increase in overall manufacturing cost including a host control device to be suppressed.

According one aspect of the present invention, a motor control device that controls driving of a motor based on position commands input from a host control device includes: an offset value memory that stores offset values that respectively correspond to predetermined values of the position commands; and a drive controller that acquires, from the offset value memory, an offset value that corresponds to an input position command, and controls driving of the motor based on an offset position command that is obtained by adding the offset value to or subtracting the offset value from the input position command.

Further, according another aspect of the present invention, a motor control device that controls driving of a motor based on position commands input from a host control device includes: a means that stores offset values that respectively correspond to predetermined values of the position commands; and a means that controls driving of the motor to a position that is offset from an input position command by an offset value that is acquired from the offset value memory in correspondence to the input position command.

Further, according another aspect of the present invention, a position control system includes: a motor control device according to an embodiment of the present invention; a motor that is driven and controlled by the motor control device; a host control device that inputs a position command to the motor control device; and a control machine that is position-controlled by the motor.

Further, according another aspect of the present invention, a motor control method in which driving of a motor is controlled based on a position command input from a host control device includes: acquiring an offset value corresponding to the input position command; and controlling driving of the motor based on an offset position command that is obtained by adding the offset value to or subtracting the offset value from the input position command.

Obviously, numerous modifications and variations of the present invention are possible in light of the above teachings. It is therefore to be understood that within the scope of the appended claims, the invention may be practiced otherwise than as specifically described herein.

The invention claimed is:

1. A motor control device for controlling driving of a motor based on position commands input from a host control device, comprising:
an offset value memory configured to store a plurality of offset values corresponding to a plurality of predetermined values of a plurality of position commands, respectively; and
a drive controller configured to acquire, from the offset value memory, one of the offset values corresponding to an input position command among the position commands, and control driving of the motor based on an offset position command obtained by adding the one of the offset values to or subtracting the one of the offset values from the input position command,
wherein the drive controller is configured to determine a master-slave relation between the motor control device and an additional motor control device to which a position command common to the motor control device is input, control the driving of the motor based on the offset position command when the motor control device has a slave relation with respect to the additional motor control device, and control the driving of the motor based on the input position command when the additional motor control device has a slave relation with respect to the motor control device.

2. The motor control device according to claim 1, wherein the offset value memory is configured to store the plurality of offset values which is a plurality of correction values with respect to differences between output positions of the motor that the motor control device controls and output positions of a motor that the additional motor control device controls.

3. The motor control device according to claim 2, wherein the plurality of correction values are set to be differences in position deviation between position feedback loops of the motor control device and the additional motor control device.

4. The motor control device according to claim 3, wherein the offset value memory is configured to store the plurality of offset values corresponding to the plurality of predetermined values each of which is set discretely, and the drive controller is configured to obtain an interpolation value of offset values that respectively correspond to predetermined values immediately before and after an offset value as the offset value corresponding to a position command value between the predetermined values.

5. The motor control device according to claim 2, wherein the offset value memory is configured to store the plurality of offset values corresponding to the plurality of predetermined values each of which is set discretely, and the drive controller is configured to obtain an interpolation value of offset values that respectively correspond to predetermined values immediately before and after an offset value as the offset value corresponding to a position command value between the predetermined values.

6. The motor control device according to claim 1, wherein the offset value memory is configured to store the plurality of offset values which is set by a user.

7. The motor control device according to claim 6, wherein the offset value memory is configured to store the plurality of offset values corresponding to the plurality of predetermined values each of which is set discretely, and the drive controller is configured to obtain an interpolation value of offset values that respectively correspond to predetermined values immediately before and after a new offset value corresponding to a position command value and set the interpolation value as the new offset value corresponding to the position command value between the predetermined values.

8. The motor control device according to claim 1, wherein the offset value memory is configured to store the plurality of offset values corresponding to the plurality of predetermined values each of which is set discretely, and the drive controller is configured to obtain an interpolation value from offset values that respectively correspond to predetermined values immediately before and after a new offset value corresponding to a position command value and set the interpolation value as the offset value corresponding to the position command value between the predetermined values.

9. The motor control device according to claim 1, wherein the offset value memory is configured to store the plurality of offset values corresponding to the plurality of predetermined values each of which is set discretely, and the drive controller is configured to obtain an interpolation value of offset values that respectively correspond to predetermined values immediately before and after an offset value as the offset value corresponding to a position command value between the predetermined values.

10. A position control system, comprising:
the motor control device of claim 1;

a motor configured to be driven by drive control of the motor control device such that the motor position controls a position control machine; and a host control device comprising third circuitry configured to input the position commands to the motor control device.

11. A motor control device for controlling driving of a motor based on position commands input from a host control device, comprising:

storing means for storing a plurality of offset values corresponding to a plurality of predetermined values of a plurality of position commands, respectively; and controlling means for controlling driving of a motor to a position that is offset from an input position command by an offset value acquired from the storing means in correspondence to the input position command, wherein the controlling means if further means for determining a master-slave relation among the motor control devices, controlling the driving of the respective one of the motors based on the offset position command when a respective one of the motor control devices has a slave relation with respect to another one of the motor control devices, and controlling the driving of the respective one of the motors based on the input position command when the respective one of the motor control devices has a master relation with respect to another one of the motor control devices.

12. A position control system, comprising:

a plurality of motors configured to control a position control machines;

a host control device comprising circuitry configured to input a plurality of position commands; and a plurality of motor control devices each comprising a drive controller configured to control driving of a respective one of the motors based on the position commands input from the host control device, wherein each of the plurality of motor control devices comprises an offset value memory configured to store a plurality of offset values corresponding to a plurality of predetermined values of the plurality of position commands, respectively, and the drive controller configured to acquire, from the offset value memory, one of the offset values corresponding to an input position command among the position commands, and control driving of the respective one of the motors based on an offset position command obtained by adding the one of the offset values to or subtracting the one of the offset values from the input position command, wherein the drive controller is configured to determine a master-slave relation among the motor control devices, control the driving of the respective one of the motors based on the offset position command when a respective one of the motor control devices has a slave relation with respect to another one of the motor control devices, and control the driving of the respective one of the motors based on the input position command when the respective one of the motor control devices has a master relation with respect to another one of the motor control devices.

13. The position control system according to claim 12, wherein the offset value memory is configured to store the plurality of offset values which is a plurality of correction values with respect to differences between output positions of the motors.

14. The position control system according to claim 13, wherein the offset value memory is configured to store the plurality of correction values set to be differences in position deviation between position feedback loops of the motor control devices.

15. The position control system according to claim 14, wherein the offset value memory is configured to store the plurality of offset values which is set by a user.

16. A method for controlling driving of a motor based on a position command input from a host control device, comprising:

acquiring an offset value corresponding to an input position command;

controlling driving of a motor based on an offset position command obtained by adding the offset value to or subtracting the offset value from the input position command, wherein the controlling of the driving comprises determining a master-slave relation between a plurality of motor control devices, controlling the driving of the motor based on the offset position command when one of the motor control devices has a slave relation with respect to another one of the motor control devices, and controlling the driving of the motor based on the input position command when the one of the motor control devices has a master relation with respect to another one of the motor control devices; and storing the plurality of offset values which is a plurality of correction values with respect to differences between output positions of the motor and output positions of another motor.

* * * * *